United States Patent
Cardin et al.

(10) Patent No.: US 11,605,938 B2
(45) Date of Patent: Mar. 14, 2023

(54) PERFORATED TRAY SPLICING SYSTEM

(71) Applicant: ABB Schweiz AG, Baden (CH)

(72) Inventors: Daniel Cardin, Sainte-Julie (CA);
Daniel Lalancette,
Saint-Jean-sur-Richelieu (CA)

(73) Assignee: ABB SCHWEIZ AG, Baden (CH)

( * ) Notice: Subject to any disclaimer, the term of this patent is extended or adjusted under 35 U.S.C. 154(b) by 294 days.

(21) Appl. No.: 16/907,057

(22) Filed: Jun. 19, 2020

(65) Prior Publication Data

US 2021/0399536 A1  Dec. 23, 2021

(51) Int. Cl.
*H02G 3/06* (2006.01)
*H02G 3/04* (2006.01)
*B65D 1/34* (2006.01)

(52) U.S. Cl.
CPC ............ *H02G 3/0608* (2013.01); *B65D 1/34* (2013.01); *H02G 3/0437* (2013.01)

(58) Field of Classification Search
CPC ........ H02G 11/02; H02G 3/0431; H02G 1/10; H02G 3/263; H02G 15/18; H02G 3/0468; H02G 1/00; H02G 3/045; H02G 3/105; H02G 1/02; H02G 3/00; H02G 15/076; H02G 3/34; H02G 15/007; H02G 3/083; H02G 15/24; H02G 9/04; H02G 1/086; H02G 3/0412; H02G 1/1297; H02G 1/14; H02G 3/06; H02G 15/064; H02G 3/0493; H02G 3/088; H02G 3/128; H02G 1/1217; H02G 3/0691; H02G 9/025; H02G 9/02; H02G 15/113; H02G 3/14; H02G 15/08; H02G 3/20; H02G 1/04; H02G 1/081; H02G 1/088; H02G 15/22; H02G 1/1256; H02G 15/04; H02G 9/10; H02G 15/10; H02G 3/0425; H02G 3/26; H02G 7/16; H02G 11/003; H02G 15/06; H02G 3/12; H02G 3/285; H02G 15/20; H02G 2200/10; H02G 3/08; H02G 3/086; H02G 3/126;
(Continued)

(56) References Cited

U.S. PATENT DOCUMENTS 1,813,331 A * 7/1931 Wadsworth .......... H02G 3/0608
361/660
2,821,154 A * 1/1958 Tennison, Jr. ........ E04D 13/068
405/122

(Continued)

*Primary Examiner* — Krystal Robinson
(74) *Attorney, Agent, or Firm* — Greenberg Traurig, LLP (57) ABSTRACT

A cable tray assembly comprising a plurality of tray segments, each tray segment comprising a first portion and a second portion positioned about first and second ends, respectively, of the tray segment. The first portion has an inner region between at least sidewalls of the tray segment that is sized to receive placement of a second end of another tray segment. Additionally, the first portion can include one or more open ended grooves that, during assembly of the cable tray assembly, can receive a mating projection that is securely connected to the second end of the other tray segment. The open ended groove can be downwardly sloped, and can extend through an outer edge of the corresponding sidewall. The projection can be fixed or adjoined to the second end at least prior to assembly of the cable tray assembly, and can include shank that is threadingly engaged by a retainer.

20 Claims, 6 Drawing Sheets

(58) Field of Classification Search
CPC ........ H02G 3/388; H02G 9/12; H02G 1/1248;
H02G 1/1265; H02G 1/1292; H02G
15/046; H02G 3/16; H02G 3/381; H02G
3/385; F16L 3/10
USPC .......................................... 59/78.1; 403/384
See application file for complete search history.

(56) References Cited

U.S. PATENT DOCUMENTS

| | | | | |
|---|---|---|---|---|
| 2,905,201 A * | 9/1959 | McNaughton | ....... | H02G 3/0437 138/159 |
| 4,857,670 A * | 8/1989 | Frank | ..... | H02G 3/266 174/101 |
| 5,024,251 A * | 6/1991 | Chapman | ........... | H02G 3/0608 16/361 |
| 5,465,929 A * | 11/1995 | Dooley | ............... | H02G 3/0456 403/294 |
| 5,995,699 A * | 11/1999 | Vargas | ................ | G02B 6/4471 385/134 |
| 6,234,429 B1 * | 5/2001 | Yang | .................. | B60R 16/0215 248/68.1 |
| 6,498,296 B2 * | 12/2002 | Benito-Navazo | .... | H02G 3/0608 174/99 R |
| 6,609,684 B2 * | 8/2003 | Van Scoy | .............. | F16G 13/16 59/78.1 |
| 7,060,893 B1 * | 6/2006 | Villi | ..................... | H02G 3/0418 248/68.1 |
| D562,120 S * | 2/2008 | Henderson | ..................... | D8/382 |
| 7,344,163 B2 * | 3/2008 | Thompson | ........... | H02G 3/0608 138/155 |
| 7,470,859 B1 * | 12/2008 | Gretz | .................. | H02G 3/0608 174/72 A |
| 7,762,042 B2 * | 7/2010 | Packard, III | ......... | H02G 3/0608 403/294 |
| 8,573,409 B2 * | 11/2013 | White | .................. | H02G 3/0608 248/65 |
| 8,979,037 B2 * | 3/2015 | Wurzer | ................. | H02G 9/025 248/65 |
| 9,362,727 B2 * | 6/2016 | Cardin | ................. | H02G 3/0608 |
| 9,841,123 B1 * | 12/2017 | White | ................. | H02G 3/0608 |
| 10,935,165 B2 * | 3/2021 | Alban | ....................... | F16L 3/26 |
| 11,316,328 B2 * | 4/2022 | Khalkar | ............... | H02G 3/0608 |
| 2003/0051892 A1 * | 3/2003 | Mattei | ................... | H02G 3/045 174/505 |
| 2003/0155148 A1 * | 8/2003 | Lockard | ............... | H02G 3/0608 174/68.1 |
| 2005/0098340 A1 * | 5/2005 | Herzog | ................. | H02G 3/0418 174/66 |
| 2010/0133390 A1 * | 6/2010 | Lange | ................. | H02G 3/0418 248/65 |
| 2015/0233497 A1 * | 8/2015 | Lacey, Jr. | ................. | F16L 3/06 248/68.1 |

* cited by examiner

PERFORATED TRAY SPLICING SYSTEM

FIELD OF INVENTION

The present invention relates to cable trays, and more particularly to adjoining tray segments of cable tray assemblies.

BACKGROUND

A variety of types of buildings and structures can often house networks of cables and conduits. Such cables and conduits can be utilized for a variety of different purposes, including, for example, the transmission or transportation of electrical power, communication signals, data signals, fluids, and gases. Often such cables and conduits within the building or structure can be routed along, and/or supported by, cable tray assemblies.

Traditionally, at least a portion of cable tray assemblies are often mounted horizontally in an overhead position at least above a floor, and/or vertically along a wall, of the associated building or structure. Yet, the horizontal and/or vertical positions at which cable trays can be installed can often contribute to making installation of cable tray assemblies difficult and cumbersome, particularly in view of the overall distance such cable tray assemblies may extend. Further, the loads that a cable tray assembly may be designed to support can increase the size and/or weight of the cable tray assembly, which can further enhance the complexity in overhead and/or vertical installation of the cable tray assembly.

Additionally, as cable tray assemblies often extend along relatively long distances, installation of cable tray assemblies can involve the assembly of a relatively large number of separate, individual components of the cable tray assembly. Such installation can often involve assembling the cable tray assembly one component at a time, which can result in a relatively prolong installation process. Further, in the addition to the challenges of installing relatively large components of the assembly at overhead vertical positions, other components in the component-by-component assembly process can be relatively small and susceptible to inadvertent dropping from overhead locations, and/or are susceptible to accidental loss or misplacement. Further, the packaging and boxing of the relatively large number of separate, individual components of a cable tray assembly can unnecessarily contribute to the costs and waste that can be associated with installation of a cable tray assembly.

Accordingly, although various cable tray assemblies are available currently in the marketplace, further improvements are possible to improve the simplicity of installation of cable tray assemblies.

BRIEF SUMMARY

An aspect of an embodiment of the present application is a tray segment comprising a first sidewall and a second sidewall, the first and second sidewalls extending between a first end and a second end of the tray segment. A portion of the first and second sidewalls can form a first portion of the tray segment, and another portion of the first and second sidewalls can form a second portion of the tray segment. Further, the first portion can extend between the first end and the second portion, and can include at least one groove that extends through at least one of the first sidewall and the second sidewall, the at least one groove having an open end and a closed end. The second portion can extend between the first portion and the second end, and can include at least one projection that extends outwardly from the second portion. The tray segment can also include at least one central web that is positioned between the first and second sidewalls. Additionally, the first and second sidewalls of the first portion can be linearly offset in an outward direction relative to the associated first and second sidewalls of the second portion, the offset being sized such that an inner region of the first portion between the first and second sidewalls has a size that is larger than a corresponding outer size of the second portion at the second end of the tray segment.

Another aspect of an embodiment of the present application is a cable tray assembly comprising a plurality of tray segments, each tray segment of the plurality of tray segments comprising a first sidewall and a second sidewall, the first and second sidewalls extending between a first end and a second end of the tray segment, a portion of the first and second sidewalls form a first portion of the tray segment, and another portion of the first and second sidewalls form a second portion of the tray segment. The first portion of the tray segment can extend between the first end and the second portion of the tray segment, and can include at least one groove in each of the first sidewall and the second sidewall. The at least one groove can have an open end and a closed end. Further, the first portion can also include an inner region between the first and second sidewalls that is sized to receive placement of the second end of another tray segment of the plurality of tray segments. The second portion can extend between the first portion and the second end of the tray segment, and the first and second sidewalls along the second portion each can include at least one projection that is sized and positioned to be received within, and displaced along, the at least one groove of an adjacent tray segment of the plurality of tray segments as the second end of the tray segment is inserted into the first portion of the adjacent tray segment. Each tray segment can also include at least one central web positioned between the first and second sidewalls.

Additionally, an aspect of an embodiment of the present application is a method for assembling a cable tray assembly that includes inserting, into at least one groove at a first end of a first tray segment, at least one projection that outwardly extends from a second end of a second tray segment, each of the first and second tray segments having a first sidewall coupled to an opposing second sidewall by at least one central web, and wherein each tray segment further comprises a first portion and a second portion, the first portion extending between the first end and the second portion, and the second portion extending between the first portion and the second end. The inserted at least one projection can be displaced along the at least one groove as the second end of the second tray segment is laid into position within an inner region of the first portion of the first tray segment. Further, upon the second end of the second tray segment being laid in position within the inner region such that the second end of the second tray segment is adjacent to the second portion of the first tray segment, a retainer can be displaced along the at least one projection to secure the second tray segment to the first tray segment.

These and other aspects of the present invention will be better understood in view of the drawings and following detailed description.

BRIEF DESCRIPTION OF THE DRAWINGS

The description herein makes reference to the accompanying figures wherein like reference numerals refer to like parts throughout the several views.

The foregoing summary, as well as the following detailed description of certain embodiments of the present application, will be better understood when read in conjunction with the appended drawings. For the purpose of illustrating the application, there is shown in the drawings, certain embodiments. It should be understood, however, that the present application is not limited to the arrangements and instrumentalities shown in the attached drawings. Further, like numbers in the respective figures indicate like or comparable parts.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

Figure 1:
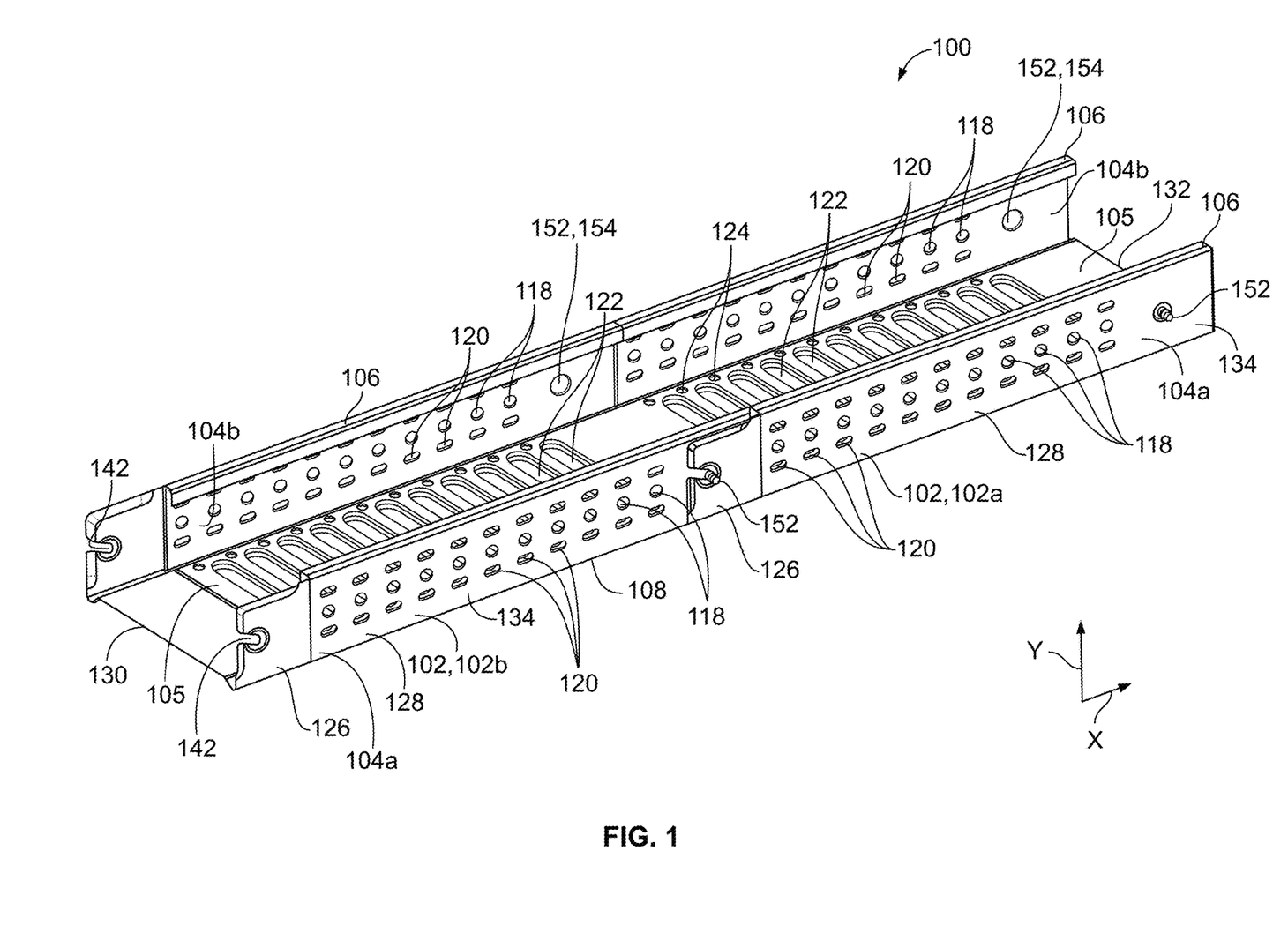
FIG. 1 illustrates a first side perspective view of a section of a cable tray assembly according to an embodiment of the present application.

FIG. 1 illustrates a first side perspective view of a section of a cable tray assembly 100 according to an embodiment of the present application. The cable tray assembly 100 can comprise a plurality of tray segments 102. While the portion of the cable tray assembly 100 shown in FIG. 1 includes a first tray segment 102a, and a second tray segment 102b, the number of tray segments 102 can vary for different installations, and can be based on a variety of criteria, including, for example, the overall length of the cable tray assembly 100. Further, the construction of each tray segment 102 can generally be similar. Thus, while for purposes of discussion, features below may be discussed and/or illustrated with respect to the depicted first tray segment 102a or the second tray segment 102b, both the first tray segment 102a and the second tray segment 102b, as well as other, if not all, other tray segments 102 of the cable tray assembly 100 can include similar features. Additionally, the tray segments 102 and cable tray assembly 100 discussed herein can be configured for use with a variety of different types of cable trays, including, but not limited to, solid-bottom trays, cable channel or trough trays, ventilated trays, and cable ladders, among others.

As seen in at least FIG. 1, according to the illustrated embodiment, the tray segment 102 can include opposing first and second sidewalls 104a, 104b, and a central web 105. According to certain embodiments, the central web 105, first sidewall 104a, and second sidewall 104b may each be part of a unitary, or monolithic, structure, and can be constructed from a variety of different materials, including, but not limited to, metals and non-metals, plastics, and composites, among other materials. Further, the central web 105 can be positioned between, and separate, the first and second sidewalls 104a, 104b. Additionally, the first sidewall 104a can be positioned along the central web 105 such that the first sidewall 104a is generally parallel to the second sidewall 104b, as seen, for example, in at least FIG. 2. Moreover, according to the illustrated embodiment, the first and second sidewalls 104a, 104b can generally be parallel to a central longitudinal axis 107 of the tray segment 102.

The first and second sidewalls 104a, 104b can include opposing top and bottom ends 106, 108. While the central web 105 can be coupled to the first and second sidewalls 104a, 104b at a variety of locations of, according to the illustrated embodiment, the central web 105 is directly attached to the bottom end 108 of the first and second sidewalls 104a, 104b, as seen in FIG. 1. Further, the central web 105 can have a variety of configurations for different types of cable tray assemblies 100. For example, while the central web 105 for the tray segments 102a, 102b depicted in FIG. 1 has a generally slotted plate configuration, according to other embodiments, the central web 105 can be non-slotted, or, alternatively, comprise a plurality of rungs or arms 105a, that may or may not be pivotable, and that extend between the first and second sidewalls 104a, 104b, as seen in the cable ladder embodiment for the tray segments 102a, 102b shown in FIG. 8.

Figure 3:
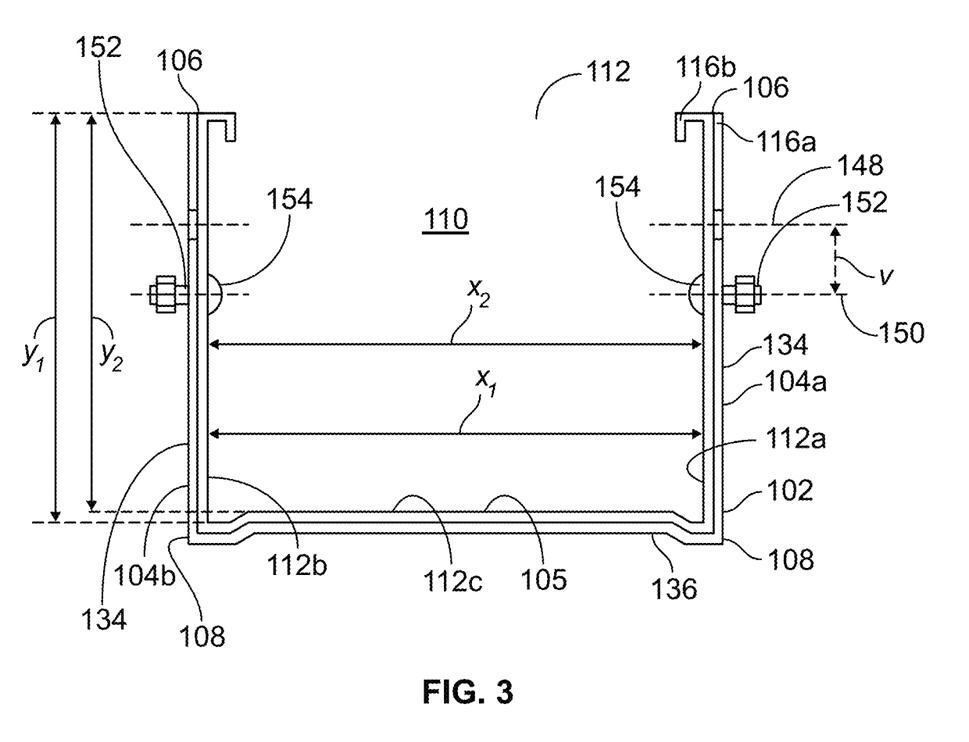
FIG. 3 illustrates a front side view of a first end of a tray segment for a cable tray assembly according to an embodiment of the present application.

As seen in FIG. 3, the tray segment 102 can also include an inner region 110 that is generally defined by inner surfaces 112a-c of the first sidewall 104a, second sidewall 104b, and central web 105, respectively. The inner region 110 can be sized to house one or more conduits and/or cables that can be routed along, and/or supported by, the associated cable tray assembly 100. Additionally, the top end 106 of the first sidewall 104a can be separated from a top end 106 of the second sidewall 104b so as to provide the tray segment 102 with an opening 114 (FIG. 3) to the inner region 110 along a top side of the tray segment 102. The opening 114 can thus be in fluid communication with the inner region 110 of the tray segment 102.

According to certain embodiments, a portion of the top end 106 of the first and second sidewalls 104a, 104b can have a shape and/or configuration that can prevent or limit potential exposure to a relatively sharp edge along the top end 106 of the first and second sidewalls 104a, 104b when conduits and/or cables are inserted into the assembled cable tray assembly 100. For example, as seen in at least FIGS. 3 and 5, according to the illustrated embodiment, at least a portion of the top end 106 of the first and second sidewalls 104a, 104b can include a first bend 116a that generally directs a first portion of the top end 106 toward the opposing first or second sidewall 104a, 104b, and a subsequent second bend 116b that redirects another, second portion of the top end 106 generally in downward directions such that the second portion is generally parallel to the opposing first or second sidewall 104a, 104b. Thus, as seen in FIG. 1, according to certain embodiments, a portion the top end 106 of the first and second sidewalls 104a, 104b can generally have an upside down "U" shape. However, as seen in at least FIG. 5, such a bent configuration for the top end 106 may not extend to certain parts of the tray segment 102a, 102b, such as, for example, not be included in portions of the tray segment 102a, 102 that are around a first end 130 of the tray segment 102a, 102b. Additionally, while FIG. 3 illustrates a particular configuration for a portion of the top end 106, the top end 106 can have a variety other shapes and configurations.

The first and second sidewalls 104a, 104b can also include a plurality of holes 118, 120 that can receive a fastener(s) or connector(s) that can be utilized to attach the tray segment 102 to one or more structures or fixtures, including, for example, a bracket, hook, and/or wall, among other structures or fixtures. As seen in at least FIG. 1, a first set of a plurality of holes 118 having a first size can be distributed at various locations along the first and second sidewalls 104a, 104b so as to provide a variety of options as to the placement of the associated fastener(s) or connector(s) that may pass through one or more of the holes 118, and thus offer a degree of flexibility as to the location at which the tray segment 102 may be securely connected to a fixture or wall. Similarly, the first and second sidewalls 104a, 104b can also having a second set of a plurality of holes 120 having a second size that is different than a corresponding first size of the holes 118 of the first set of holes, and which are also distributed at various locations along the first and second sidewalls 104a, 104b for at least similar reasons.

The central web 105 can, for at least certain types of cable tray assemblies 100, include a plurality of slots 122, that can, according to certain embodiments, provide locations for ingress/egress of cables and/or conduits into/from the inner region 110 of the tray segment 102, and thus into/out of the associated the cable tray assembly 100. Additionally, according to certain embodiments, such slots 122 can provide vents and/or reduce the weight of the central web 105. Further, similar to the first and second sidewalls 104a, 104b, the central web 105 can, for certain types of cable tray assemblies 100, include a plurality of holes 124 distributed at various locations along the central web 105 that provide a variety of options as to the placement of the associated fastener(s) or connector(s) that may pass through one or more of the holes 124 that can be utilized to attach the tray segment 102 to one or more structures or fixtures, including, for example, a bracket, hook, and/or wall, among other structures or fixtures.

Figure 2:
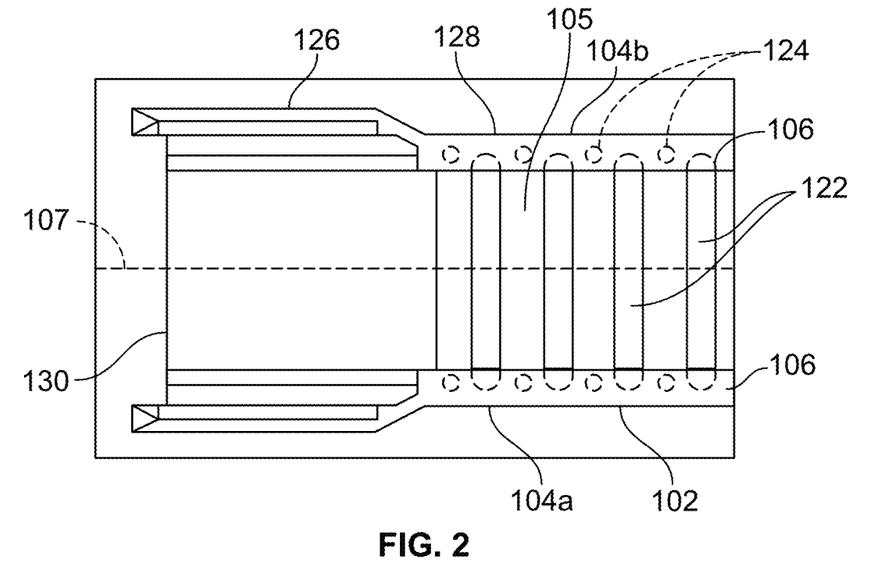
FIG. 2 illustrates a top side view of a first end of a tray segment for a cable tray assembly according to an embodiment of the present application.

Referencing FIGS. 1-3, the tray segment 102 may be divided into at least generally adjacent first and second portions 126, 128. The first portion 126 can generally extend between the first end 130 of the tray segment 102 to the second portion 128, while the second portion 128 of the tray segment 102 can generally extend from the first portion 126 to a second end 132 (FIG. 1) of the tray segment 102. Further, the inner region 110 along the first portion 126 of the tray segment 102 can be sized to receive within the inner region 110 placement of at least the second end 132, as well as a portion of the second portion 128, of another, adjacent tray segment 102. Moreover, as shown in at least FIG. 3, at least the cross sectional size of the inner region 110 along the first portion 126 of the tray segment 102 may be enlarged relative to the inner region 110 along the second portion 132 of the same tray segment 102 so that the inner region 110 along the first portion 126 can receive insertion of, and be assembled to, the second end 132 of an adjacent tray segment 102. Thus, as indicated by FIG. 1, such receipt of the second end 132 of a tray segment 102 within the enlarged first portion 126 of an adjacent tray segment 102b can accommodate a degree of overlapping between the adjacent first and second ends 130, 132 of a pair of assembled tray segments 102a, 102b. Moreover, according to such an embodiment, the first end 130 of a first tray segment 102a can be sized and configured to accommodate lay-in assembly of the second end 132 of another, second tray segment 102b. Thus, the second end 132 of the second tray segment 102b, as well as a portion of the associated second portion 128 of the second tray segment 102b, can be laid into the first end 130, and moreover, at least a portion of the first portion 126 of a first tray segment 102a. Further, the first portion 126 of the first tray segment 102a can be sized such that the lay-in assembly of the second tray segment 102b to the first tray segment 102a can occur via insertion of a portion of the second tray segment 102b through the opening 114 of the first tray segment 102a, with relatively low, if any, resistance from the first and second sidewalls 104a, 104b along the first portion 126 of the first tray segment 102a.

For example, referencing FIGS. 2 and 3, the portion of the first and second sidewalls 104a, 104b that extend along the first portion 126 of the tray segment 102 can be outwardly swelled relative to other portions of the associated first and second sidewalls 104a, 104b. Moreover, the portion of the first sidewall 104a along the first portion 126 can be outwardly swelled so as to be linearly offset from the other portions of the first sidewall 104a that extend along the second portion 128 of the tray segment 102. Similarly, the portion of the second sidewall 104b along the first portion 126 can also be outwardly swelled, and thus offset from, the other portions of the second sidewall 104b that that extend along the second portion 128 of the tray segment 102. Such swelling or offsetting of the first and second sidewalls 104a, 104b along the first portion 126 of the tray segment 102 can be in a direction that is generally orthogonal to the central longitudinal axis 107 of the tray segment 102. Moreover, such offsets can be in a generally outwardly direction that increases a linear distance (as indicated by "$x_1$" in FIG. 3) between the opposing inner surfaces 112a, 112b of the first and second sidewalls 104a, 104b along the first portion 126 of the tray segment 102.

The degree or extend of the offset of the sidewalls 104a, 104b along the first portion 126 can vary. For example, according to certain embodiments, the degree of offset for each sidewall 104a, 104b along the first portion 126 can generally be equal to a wall thickness between an inner surface 112a-c and an outer surface 134 of the portions of the associated first or second sidewall 104a, 104b that extend along the second portion 128 of the tray segment 102. Moreover, according to certain embodiments, the offset for each sidewall 104a, 104b along the first portion 126 of the tray segment 102 can generally be equal to the plate thickness of the portions of the first and second sidewalls 104a, 104b that extend along the second portion 128. Thus, according to certain embodiments, the offset can be sized such that the distance opposing inner surfaces 112a, 112b of the first and second sidewalls 104a, 104b along the first portion 126 of the tray segment 102 can be greater than a corresponding distance between outer surfaces of the first and second sidewalls 104a, 104b along the second portion 128 of the tray segment 102 such that, during assembly of the cable tray assembly 100, at least a portion of a second portion 128 around a second end 132 of one tray segment 102b can be received, or laid, in the inner region 110 of the expanded first portion 126 of another tray segment 102a.

Thus, for example, FIG. 3 illustrates the first and second sidewalls 104a, 104b at the first portion 126 of the tray segment 102 being separated by a distance $x_1$. FIG. 3 also illustrates a distance of $x_2$ between the first and second sidewalls 104a, 104b that extend along the second portion 128 of the same tray segment 102. According to embodiments in which the first and second sidewalls 104a, 104b are each outwardly offset at the first portion 126 of the tray segment 102 by a distance that is generally equal to the wall or plate thickness of the associated sidewall 104a, 104b at the second portion 128 of the tray segment 102, the distance $x_1$ between the first and second sidewalls 104a, 104b at the first portion 126 is larger than the distance $x_2$ between the first and second sidewalls 104a, 104b at the second portion 128 by an amount that is generally the sum of the wall or plate thicknesses of both the first sidewall 104a and second sidewall 104b along the second portion 128 of the tray segment 102.

The portion of the central web 105 that extends along the first portion 126 of the tray segment 102 can also be similarly linearly offset from the other portions of the central web 105 that extend along the second portion 128 of the tray segment 102. Such an offset, which again can increase a cross sectional size of the inner region 110, can be in a generally downward direction. More specifically, the central web 105 at the first portion 126 of the tray segment 102 can be in a direction that is generally perpendicular to both the central longitudinal axis 107 of the tray segment 102, as well as generally perpendicular to the outwardly direction of the above-discussed offsets or swelling of the first and second sidewalls 104a, 104b. Further, similar to the above-discussed offsets for the first and second sidewalls 104a, 104b, according to certain embodiments, the central web 105 along the first portion 126 of the tray segment 102 can be downwardly offset from the portion of the central web 105 along the second portion 128 by a distance that is generally equal to a wall or plate thickness between opposing inner and outer surfaces 112c, 136 of the portion of central web 105 that extends along the second portion 128 of the tray segment 102. Thus, for example, according to certain embodiments, the central web 105 along the first portion 126 of the tray segment 102 can be separated from the top ends 106 of the sidewalls 104a, 104b by a distance (as indicated by "$y_1$" in FIG. 3) that is larger than a corresponding distance between the top ends 106 of the sidewalls 104a, 104b and the portion of the central web 105 that extends along the second portion 128 (as indicated by "$y_2$" in FIG. 3) by a distance that is generally equal to the wall or plate thickness of the central web 105 along the second portion 128 of the tray segment 102.

Figure 5:
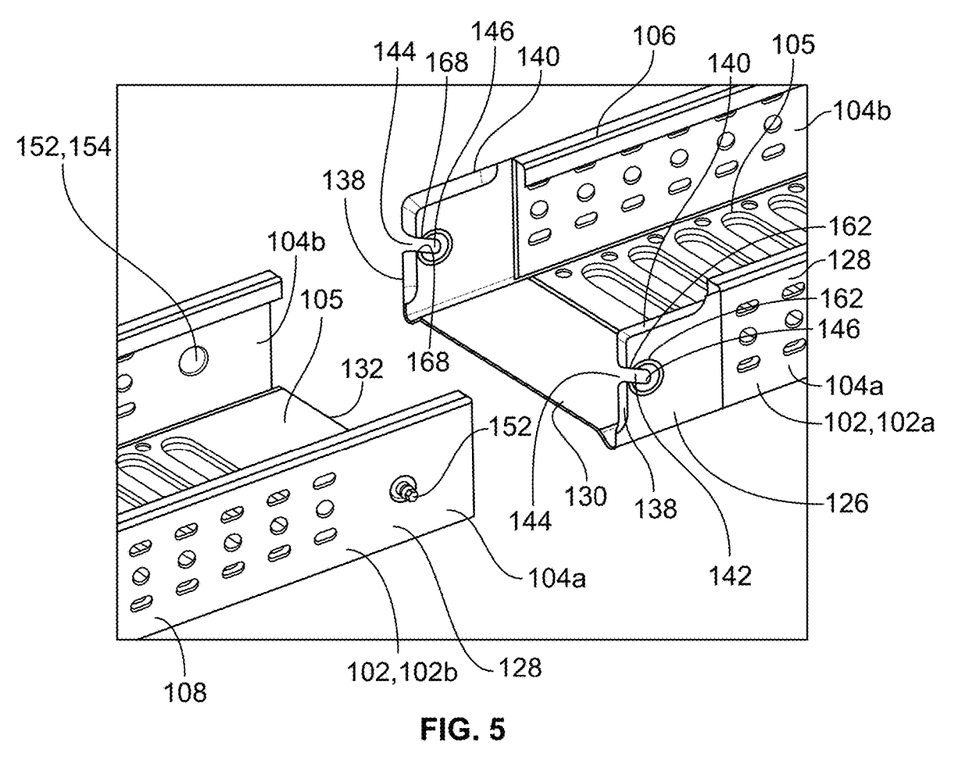
FIG. 5 illustrates a first side perspective view of a first end of a first tray segment disengaged from a second end of a second tray segment of a cable tray assembly according to an embodiment of the present application.
Figure 6:
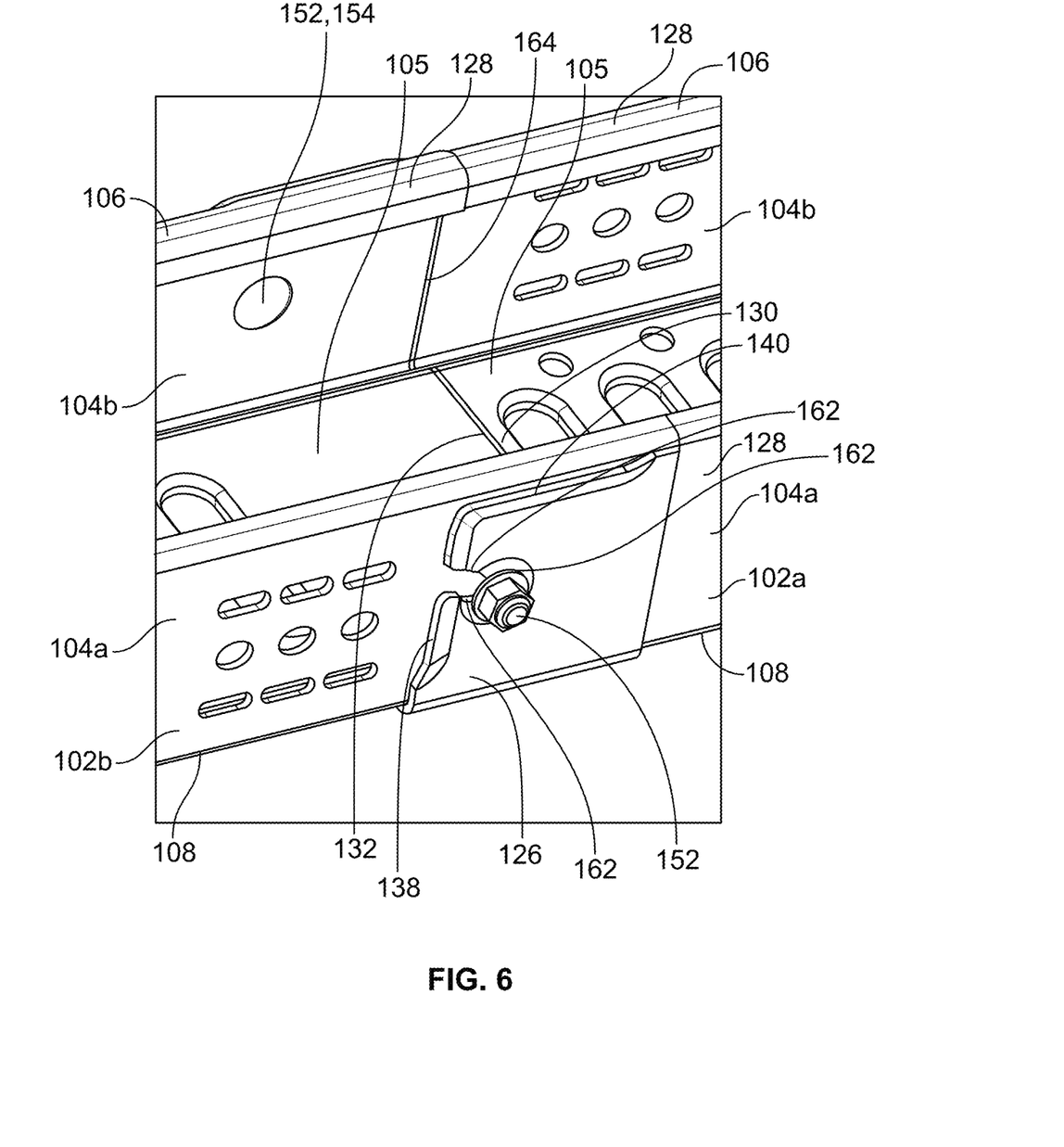
FIG. 6 illustrates a first side perspective view of a first end of a first tray segment engaged with a second end of a second tray segment of a cable tray assembly according to an embodiment of the present application.

As seen in at least FIG. 5, the first and second sidewalls 104a, 104b along the first portion 126 of the tray segment 102 can each include a first outer edge 138, a second outer edge 140, and at least one downwardly sloped groove 142. According to the illustrated embodiment, the first outer edge 138 can be generally perpendicular to the second outer edge 140. Further, as seen in at least FIGS. 5 and 6, the first outer edge 138 and/or the second outer edge 140 can be outwardly flared, bent, or angled away from the inner region 110, as well as away from the adjacent portions of the corresponding first or second sidewalls 104a, 104b, so as to form flanges at the corresponding first outer edge 138 and/or second outer edge 140. Additionally, according to the embodiment depicted in at least FIGS. 1, 5, and 6, the downwardly sloped groove 142 can decline in both inwardly and downwardly directions from an open end 144 that extends or breaks through one of the first and second outer edges 138, 140, to a closed end 146 of the groove 142. As seen in at least FIG. 5, the closed end 146 of the groove 142 can be located in the first portion 126 of the tray segment 102.

The degree of downward decline and/or slope of the groove 142 can vary. Further, the groove 142 can be sloped so as to be both non-parallel and non-perpendicular to at least the central longitudinal axis 107 of the tray segment 102. Moreover, the open end 144 of the groove 142 can be offset from the closed end 146 of the groove 142 in at least two different directions, including for example, in both a vertical direction and a horizontal direction, as generally indicated by the "y" and "x" axes, respectively, shown in FIG. 1. For example, a center location of the open end 144 (as generally indicated by open end center axis line 148 in FIG. 3) of the groove 142 can extend through one of the first and second outer edges 138, 140 at a vertical position along the corresponding first or second sidewall 104a, 104b that is higher than an corresponding vertical position of a center location of the closed end 146 (as generally indicated by closed end center axis line 150 in FIG. 3) of the groove 142. The differences in the vertical locations, or heights, of the open and close end center lines 148, 150 is generally indicated by the length "v" in FIG. 3. Additionally, with respect to an offset in a horizontal direction, the closed end 146 of the groove 142 can be positioned at a linear distance away from the first end 130 of the tray segment 102, and in a direction generally toward the second end 132 of tray segment 102, that is different than a corresponding linear distance, if any, between the open end 144 of the groove 142 and the first end 130 of the tray segment 102.

Figure 4:
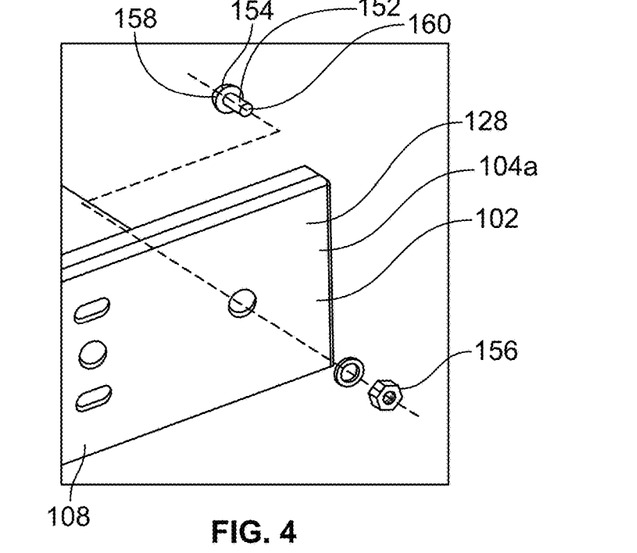
FIG. 4 illustrates a first side perspective view of a second end for a tray segment of a cable tray assembly according to an embodiment of the present application.

As shown in at least FIGS. 4 and 5, the second end 132 of the tray segment 102 can include at least one embedded projection 152 that is configured to be received in a mating groove 142 in a first end 130 of an adjacent tray segment 102. The embedded projection 152 can extend from a first end 158 to a second end 160 of the embedded projection 152. According to certain embodiments, the embedded projection 152 can comprise a head 154 at the first end 158 of the embedded projection 152, and a shank 154 that extends from the head 154 to the opposing second end 160 of the embedded projection 152. Additionally, according to certain embodiments, at least a portion of the shank 154 can include an external thread that is configured to threadingly engage a mating internal thread of a retainer 156, such as, for example, a mating nut or locknut.

According to certain embodiments, a first end 158 of the embedded projection 152, such, as for example, the head 154, is positioned adjacent to, and/or abuts, the inner surface 112a, 112b of the corresponding first or second sidewall 104a, 104b, and the opposing end 160 of the embedded projection 152 extends outside of the inner region 110 in a direction away from the corresponding first or second sidewall 104a, 104b. Moreover, the shank 154 can outwardly extend from the adjacent first or second sidewall 104a, 104b in a direction that is generally perpendicular to the central longitudinal axis 107 of the tray segment 102. Further, the shank 154 can be positioned and configured to extends away from the corresponding first or second sidewall 104a, 104b in a manner that accommodates, during assembly of the cable tray assembly 100, the embedded projection(s) 152 of one tray segment 102b being received in the downwardly sloped groove(s) 142 of another tray segment 102a.

Additionally, according to certain embodiments, the first end 158 of the embedded projection 152, such, as for example, the head 154, is positioned adjacent to, and/or abuts, the inner surface 112a, 112b of the corresponding first or second sidewall 104a, 104b. Further, as discussed below, the first end 158 and/or head 154 of the embedded projection 152 can have a size, such as, for example, a diameter, that is larger than a corresponding size of the shank 154, which can assist in pressing the first end 158 and/or head 152 against the inner surface 112a, 112b of the adjacent sidewall 104a, 104b as the retainer 156 is threadingly displaced along with the shank 154. Such a configuration of the first end 158 and/or head 152 can, as the retainer 156 is tightened along the threaded portion of the shank 154, assist in providing a clamping force against at least the portion of the sidewalls 104a, 104b of two tray segments 102a, 102b that are positioned between the head 152 and the retainer 156.

According to the illustrated embodiment, the second portion 128 of the tray segment 102 includes at least one embedded projection 152 that is embedded in, and/or secured to, the first sidewall 104a, and at least one other embedded projection 152 is embedded in, and/or secured to, the second sidewall 104b. Further, according to the illustrated embodiment, the embedded projections 152 are embedded in, and/or secured to, the first and second sidewalls 104a, 104b in a manner which prevents the embedded projections 152 from rotating relative to the associated first or second sidewalls 104a, 104b, as well as prevents translation of the embedded projections 152, including, for example, being linearly displaced relative to the associated first or second sidewalls 104a, 104b in a manner that alters a distance between at least the first end 158 of the embedded projection 152 and the central longitudinal axis 107 of the tray segment 102.

The embedded projection 152 can be embedded or secured at a relatively fixed position, including at a fixed angular orientation, in a variety of manners. For example, according to certain embodiments, the embedded projection 152 can be at least partially secured in a fixed manner to the adjacent first or second sidewall 104a, 104b via use of one or more mechanical fasteners, including, for example, via a retention clip or pin. Additionally, the according to certain embodiments, at least a portion of the embedded projection 152 can have a shape, such as, for example, a non-round shape that extends through a similarly shaped mating opening in the first or second sidewall 104a, 104b that prohibits rotational displacement of the embedded projection 152 relative to at least the corresponding first or second sidewall 104a, 104b. Alternatively, according to other embodiments, the embedded projection 152 can be a mechanical fastener, such as, for example, a threaded bolt or screw, that is welded or adhered to the first or second sidewall 104a, 104b.

According to the illustrated embodiment, the downwardly sloped groove(s) 142 in the first end 130 of a tray segment 102 can have a size, such as, for example, a width across opposing walls of the groove 142 that is similar to, if not larger, than a corresponding width or diameter of at least the portion of the shank 154 of the embedded projection 152 that is to be received in the groove 142. Such sizes can be configured to prevent the sidewalls of the groove 142 from interfering with the displacement of the embedded projection 152 from the open end 144 to the closed end 146 of the groove 142. Further, according to certain embodiments, the open end 144 of the groove 142 can be larger than other portions of the groove 142 in a manner that may improve the ease with which the embedded projection 152 can be inserted into the groove 142. For example, according to certain embodiments, the walls 168 of the groove 142 may be outwardly tapered around the open end 144 such that a width between the walls 168 at the beginning of the open end 144 is larger than a width between the walls 168 along other portions, if not the rest, of the groove 142.

Additionally, according to certain embodiments, the closed end 146 of the groove 142 can be encircled by a circular bulge 162 in the associated first or second sidewall 104a, 104b that is embossed in a generally outwardly direction away from the central longitudinal axis 107 of the tray segment 102. Such a bulge 162 can provide a degree of reinforcement to the portion of the associated first and second sidewalls 104a, 104b that extend along the sloped end 146 of the groove 142. Additionally, the outwardly direction of the circular bulge 162 can assist in preventing the embedded projection from being pulled or sliding through the closed end 146 of the groove 142.

During assembly, as a second end 132 of a second tray segment 102b is being laid into the first end 130 of a first tray segment 102a, and more specifically, being laid into the first portion 126 of the first end 130 of the first tray segment 102a, the one or more embedded projections 152 around the second end 132 of the second tray segment 102b can be placed in the open end 144 of the mating downwardly sloped grooves 142 at the first end 130 of the first tray segment 102a. According to certain embodiments, the angled or bent configuration of the flange(s) along the first and/or second outer edges 138, 140 of the first portion 126 of the first tray segment 102a can be configured to assist with guiding the embedded projection(s) 152 of the second tray segment 102b into the adjacent open end 144 of the mating groove(s) 142 of the first tray segment 102a.

Further, each of the grooves 142 of the tray segment 102 can have a sloped decline that, once the embedded projection(s) 152 of another tray segment 102b are positioned in the open end 144 of the groove(s) 142, can accommodate the weight of the inserted tray segment 102 being used to facilitate the attached embedded projection(s) 152 sliding down the groove(s) 142 to the closed end 146 of the groove 142. Additionally, the groove(s) 142 in the first portion 156 of the tray segment 102 can have vertical positions relative to the mating embedded projection 152 such that, when two tray segments 102a, 102b are assembled together, the inner surfaces 112c of the central web 105 of the assembled tray segments 102a, 102b are generally level with each other.

Additionally, as shown in FIG. 1, according to certain embodiments, the mating embedded projection(s) 152 and groove 142 can have horizontal positions and configurations relative to each other such that when the embedded projection 152 is positioned in the closed end 146 of the groove 142, the second end 132 of the second tray segment 102b that is inserted into the first end 130, or first portion 126, of the first tray segment 102a can extend a depth into the inner region 110 of the first tray segment 102a such that the second tray segment 102b can reach the end of the first portion 126 of the first segment 102a. Thus, according to certain embodiments, when the second end 132 of the second tray segment 102b is laid in the first end 130, or first portion 126, of the first tray segment 102a, a junction 164 between the second end 132 of the second tray segment 102b and the adjacent portion of the first tray segment 102a within the inner region 110 of the first tray segment 122 can be located generally at the location at which the first and portion 126 of the first tray segment 102a is adjoined to the second portion 128 of the first tray segment 102a.

With the second end 132 of the second tray segment 102b laying in the inner region 110 of the first end 130, or first portion 126, of the first tray segment 102a, and thus the embedded projection(s) 152 positioned at or around the closed end 146 of the mating groove 142, the retainer 156 can be rotatably displaced along the mating external thread of the shank 154 so as to tighten the retainer 156 against the adjacent first or second sidewall 104a, 104b of the second tray segment 102b. As previously mentioned, such tightening of the retainer 156 can securely press or clamp the adjacent portions of the first or second sidewall 104a, 104b of the first and second tray segments 102a, 102b between the first end 158 or head 154 of the embedded projection 152 and the retainer 156.

The process of laying a second end 132 of a tray segment 102 into a first end 130 of another tray segment 102, including the insertion and displacement of associated embedded projections 152 into the mating grooves 142, and subsequent tightening of the corresponding retainers 156, can be repeated for additional tray segments 102 at least until the cable tray assembly 100 attains a desired length.

Figure 7:
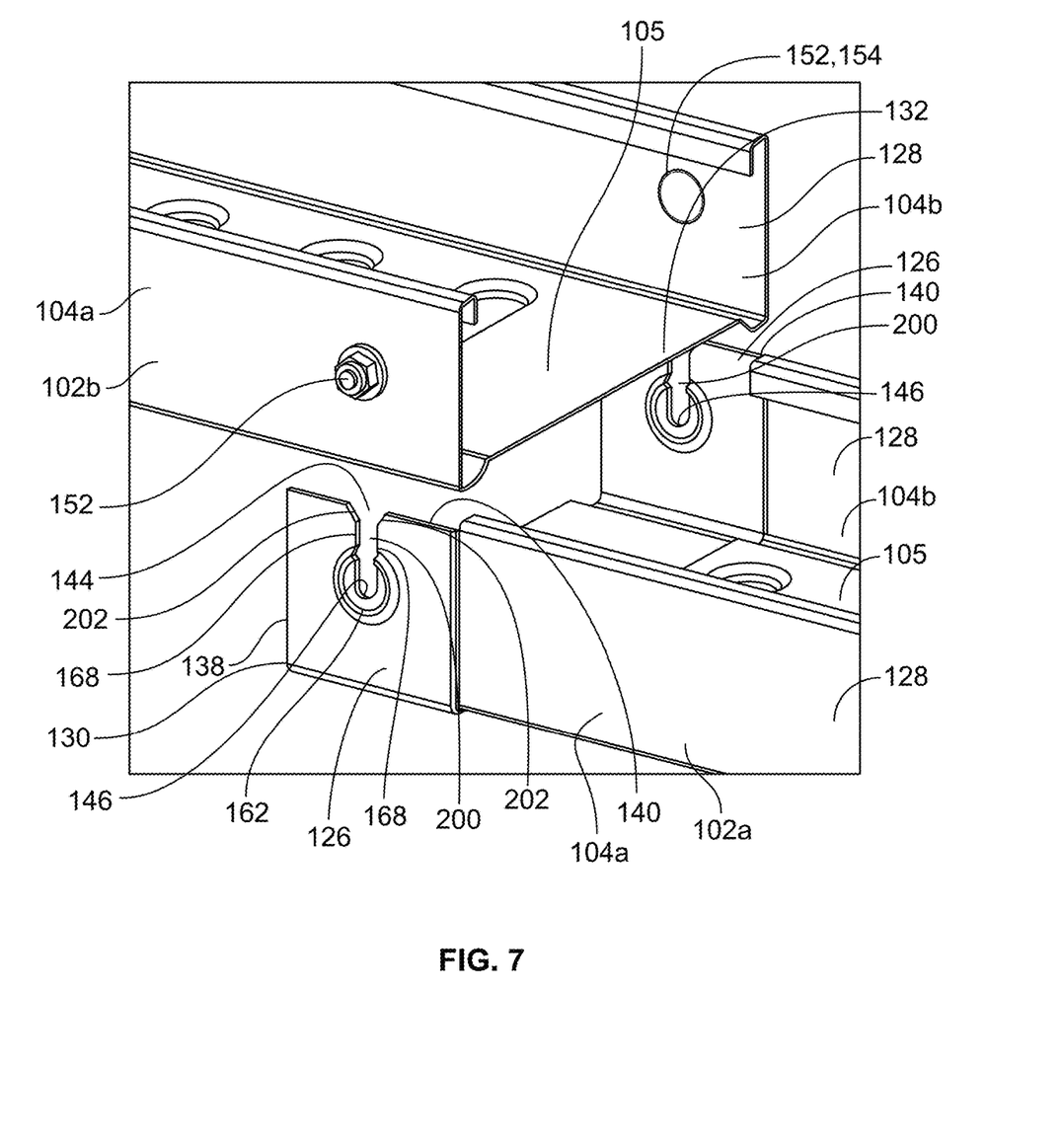
FIG. 7 illustrates a first side perspective view of a first end of a first tray segment disengaged from a second end of a second tray segment of a another embodiment of a cable tray according to the present application.

FIG. 7 illustrates another embodiment for the groove 200 in the first portion 126 of the tray segment 102a. As shown, according to certain embodiments, the first portion of the tray segment 102a can include at least one groove 200. Additionally, as shown, according to certain embodiments, rather than being downwardly sloped, the open end 144 and the closed end 146 of the groove 200 can be offset in only one direction, namely a vertical direction. Thus, according to the embodiment illustrated in FIG. 7, the open end 144 of the groove 200 can extend through the second outer edge 140 of the first and/or second sidewalls 104a, 104b. Further, the open end 144 and the closed end 146 can generally be separated by the same linear distance from the first end 130 of the tray segment 102a such the closed end 146 is generally horizontally aligned with the open end 144 of the groove 200. Additionally, as shown in FIG. 7, according to certain embodiments, the portions of the walls 168 of the groove 200 that are adjacent to the second outer edge 140 can include outwardly tapered sections 202 that can increase a size, such as a width, of at least a portion of the open end 144. Such an increase in the size of the open end 144 of the groove 200, which is also applicable to other embodiments of the groove 142 discussed herein, can assist with the ease in which the mating embedded projection 152 can be placed within the open end 144 of the groove 200. Further, similar to the groove 142 depicted in FIGS. 1-6, once the embedded projection(s) 152 of one tray segment 102b is/are positioned in the open end 144 of the groove 200 of another, tray segment 102a, the weight of the tray segment 102b having the inserted embedded projection(s) 152 can assist in facilitating the embedded projection(s) 152 moving to the closed end 146 of the groove 200.

Figure 8:
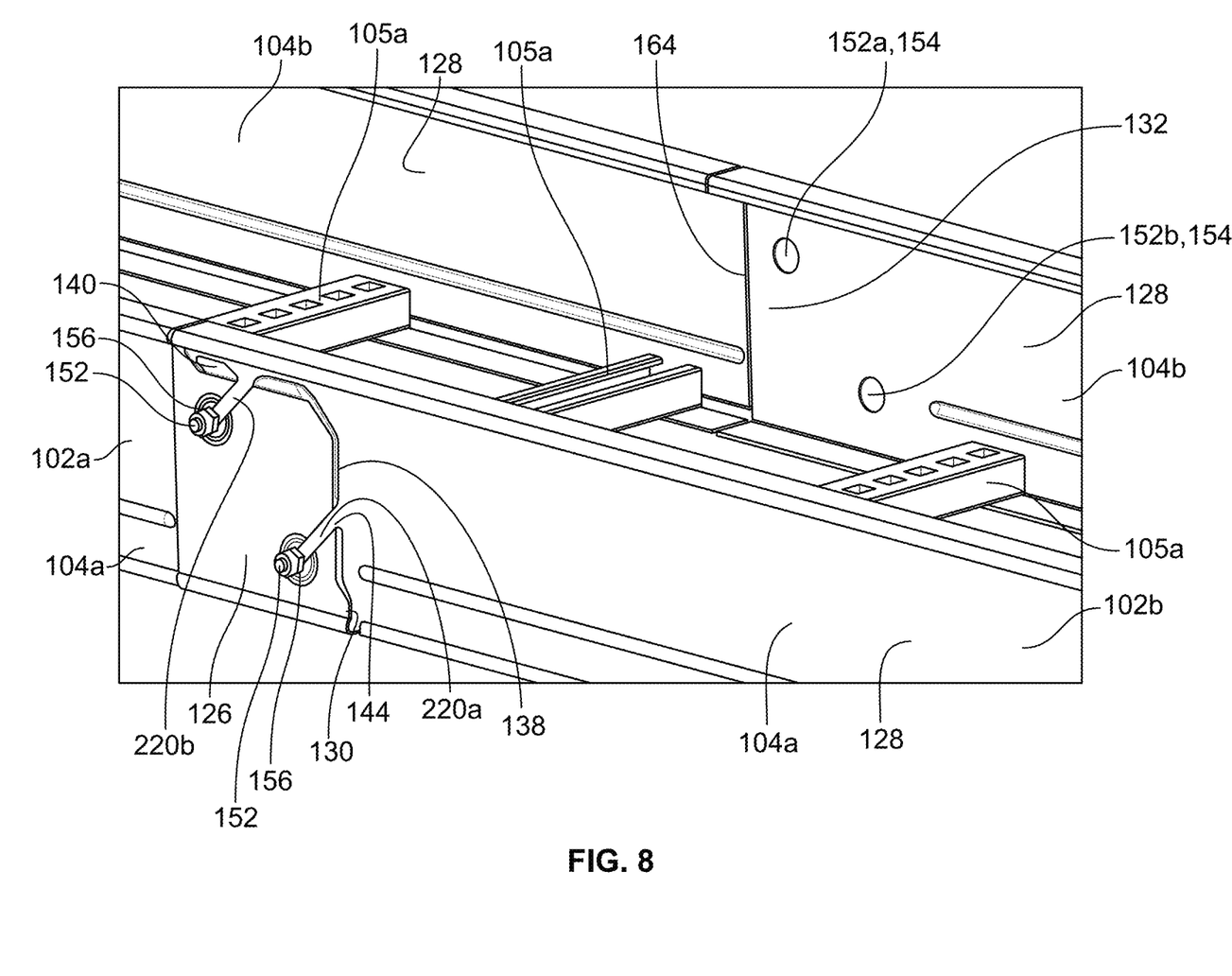
FIG. 8 illustrates a first side perspective view of a first end of a first tray segment engaged with a second end of a second tray segment of a further embodiment of a cable tray according to the present application.

FIG. 8 illustrates exemplary features of first and second portions 126, 128 for another embodiment of the tray segments 102a, 102b. Although the tray segments 102a, 102b shown in FIG. 8 are configured to form a ladder tray assembly, as with other features discussed herein, the below-discussed features can be utilized with a variety of types of cable tray assemblies 100.

As shown in FIG. 8, the first and second sidewalls 104a, 104b at the first portion 126 of the tray segments 102a, 102b can include a plurality of downwardly sloped grooves 220a, 220b. Similarly, as also shown in FIG. 8, according to certain embodiments, the first and second sidewalls 104a, 104b at the second portion 128 of the tray segments 120a, 102b can also each include a plurality of embedded projections 152a, 152b. Moreover, the embodiment shown in FIG. 8, each sidewall 104a, 104b along the first portion 126 of the tray segment 102 includes a first downwardly sloped groove 220a having an open end 144 that extends through the first outer edge 138, and a second downwardly sloped groove 220b having an open end 144 that extends through the second outer edge 140. Similar to the downwardly sloped groove 142 shown in at least FIGS. 1 and 5, the first and second grooves 220a, 220b can be downwardly sloped to form an inwardly directed decline from the open end 144 to a lower closed end 146 of the grooves 220a, 220b. Thus, the first and second grooves 220a, 220b are both non-parallel and non-perpendicular to the central longitudinal access 107 of the associated tray segment 102a 102b. Further, the angle of decline can be the same for the first and second grooves 220a, 220b such that the first and second grooves 220a, 220b are generally parallel to each other.

As also shown in FIG. 8, according to certain embodiments, the first and second sidewalls 104a, 104b along the second portion 126 of tray segment 102a, 102b near the second end 132 of the tray segment 102a, 102b can include corresponding first and second embedded projections 152a, 152b. The first and second embedded projections 152a, 152b can be similar to the above-discussed embedded projections 152 that are shown in at least FIG. 6. Thus, the first and second embedded projections 152a, 152b can also be configured to be in a fixed relationship with the corresponding first or second sidewall 104a, 104b, as well as be configured for similar engagement with a retainer 156. Additionally, the first and second embedded projections 152a, 152b can be positioned relative to the mating first and second grooves 220a, 220b such that, when the first and second embedded projections 152a, 152b of a one tray segment 102b are positioned in the closed end 146 of the mating first and second grooves 202a, 2022b in another tray segment 102a, the inner surfaces 112c of the central webs 105 of the adjoined tray segments 102a, 102b are generally level with each other, and the junction 164 between the adjoined tray segments 102a, 102b is at a location that is similar to the junction 164 discussed above with respect to FIG. 6.

While the invention has been described in connection with what is presently considered to be the most practical and preferred embodiment, it is to be understood that the invention is not to be limited to the disclosed embodiment (s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. A tray segment comprising:
    a first sidewall and a second sidewall, the first and second sidewalls extending between a first end and a second end of the tray segment, a portion of the first and second sidewalls at a first end form a first portion of the tray segment, and another portion of the first and second sidewalls at a second end form a second portion of the tray segment, the first portion extends between the first end and the second portion and includes at least one groove that extends through at least one of the first sidewall and the second sidewall, the at least one groove having an open end and a closed end, and the second portion extends between the first portion and the second end and includes at least one projection that extends outwardly from the first sidewall and the second sidewall; and at least one central web positioned between the first and second sidewalls, wherein the first and second sidewalls of the first portion are linearly offset in an outward direction relative to the associated first and second sidewalls of the second portion, the offset being sized such that an inner region of the first portion between the first and second sidewalls has a size that is larger than a corresponding outer size of the second portion at the second end of the tray segment.

2. The tray segment of claim 1, wherein a portion of the at least one central web is positioned along the first portion of the tray segment and is outwardly offset relative to another portion of the at least one central web that is positioned along the second portion of the tray segment.

3. The tray segment of claim 2, wherein the portion of the at least one central web that is positioned along the first portion of the tray segment is outwardly offset by a distance that is equal to approximately a wall thickness of the portion of the at least one central web that is positioned along the second portion of the tray segment.

4. The tray segment of claim 1, wherein the portion of the first sidewall along the first portion of the tray segment is offset from the portion of the first sidewall along the second portion of the tray segment by a distance that is equal to approximately a wall thickness of the first sidewall.

5. The tray segment of claim 1, wherein the at least one groove comprises at least one groove in each of the first sidewall and the second sidewall.

6. The tray segment of claim 5, wherein the open end of the at least one groove is positioned at a vertical location that is different than a vertical location of the closed end.

7. The tray segment of claim 6, wherein the closed end is linearly offset from the open end in a linear direction toward the second end of the tray segment.

8. The tray segment of claim 7, wherein the first and second sidewalls each include a first outer edge and second outer edge, and the at least one groove comprises a first groove and a second groove, the open end of the first groove extending through the first outer edge, and the open end of the second groove extending through the second outer edge.

9. The tray segment of claim 1, wherein the at least one projection is securely fixed to the second portion and includes a threaded portion.

10. A cable tray assembly comprising:

a plurality of tray segments, each tray segment of the plurality of tray segments comprising:

a first sidewall and a second sidewall, the first and second sidewalls extending between a first end and a second end of the tray segment, a portion of the first and second sidewalls at a first end form a first portion of the tray segment, and another portion of the first and second sidewalls at a second end form a second portion of the tray segment, the first portion extends between the first end and the second portion and includes at least one groove in each of the first sidewall and the second sidewall, the at least one groove having an open end and a closed end, the first portion further including an inner region between the first and second sidewalls that is sized to receive placement of the second end of another tray segment of the plurality of tray segments, the second portion extends between the first portion and the second end, the first and second sidewalls along the second portion each including at least one projection, the at least one projection sized and positioned to be received within, and displaced along, the at least one groove of an adjacent tray segment of the plurality of tray segments as the second end of the tray segment is inserted into the first portion of the adjacent tray segment; and at least one central web positioned between the first and second sidewalls.

11. The cable tray assembly of claim 10, wherein a portion of the at least one central web is positioned along the first portion of the tray segment and is outwardly offset relative to another portion of the at least one central web that is positioned along the second portion of the tray segment.

12. The cable tray assembly of claim 11, wherein the portion of the at least one central web that is positioned along the first portion of the tray segment is outwardly offset by a distance that is equal to approximately a wall thickness of the portion of the at least one central web that is positioned along the second portion of the tray segment.

13. The cable tray assembly of claim 10, wherein the portion of the first sidewall along the first portion of the tray segment is offset from the portion of the first sidewall that is along the second portion of the tray segment by a distance that is equal to approximately a wall thickness of the first sidewall, and wherein the portion of the second sidewall along the first portion of the tray segment is offset from the portion of the second sidewall that is along the second portion of the tray segment by a distance that is equal to approximately a wall thickness of the second sidewall.

14. The cable tray assembly of claim 10, wherein the open end of the at least one groove extends through at least one of a first outer edge and a second outer edge of the corresponding first and second sidewall.

15. The cable tray assembly of claim 14, wherein the open end of the at least one groove is positioned at a vertical location that is different than a vertical location of the closed end.

16. The cable tray assembly of claim 15, wherein the closed end of the at least one groove is linearly offset from the open end in a linear direction toward the second end of the tray segment.

17. The cable tray assembly of claim 16, wherein the at least one groove comprises a first groove and a second groove, and wherein, for each of the first and second sidewalls, the open end of the first groove extends through the first outer edge, and the open end of the second groove extends through the second outer edge.

18. The cable tray assembly of claim 10, wherein the at least one projection is securely fixed to the second portion and includes a threaded portion.

19. A method for assembling a cable tray assembly comprising:

inserting, into at least one groove at a first end of a first tray segment, at least one projection that outwardly extends from a second end of a second tray segment, each of the first and second tray segments having a first sidewall coupled to an opposing second sidewall by at least one central web, and wherein each tray segment further comprises a first portion and a second portion, the first portion extending between the first end and the second portion, and the second portion extending between the first portion and the second end;

displacing the inserted at least one projection along the at least one groove as the second end of the second tray segment is laid into position within an inner region of the first portion of the first tray segment; and displacing, upon the second end of the second tray segment being laid in position within the inner region such that the second end of the second tray segment is adjacent to the second portion of the first tray segment, a retainer along the at least one projection to secure the second tray segment to the first tray segment.

20. The method of claim 19, wherein displacing the retainer comprises displacing the retainer along a thread of the at least one projection and tightening the retainer against the adjacent first or second sidewall of the first tray segment.

* * * * *